United States Patent
Asbury et al.

(10) Patent No.: US 7,819,480 B2
(45) Date of Patent: Oct. 26, 2010

(54) TWO-PIECE HEAD RESTRAINT AND METHOD FOR MAKING SAME

(75) Inventors: James Daniel Asbury, New Hudson, MI (US); Timothy F. O'Brien, White Lake, MI (US); Hanspeter Glatt, Ellhofen (DE)

(73) Assignee: Magna International Inc., Aurora (CA)

( * ) Notice: Subject to any disclaimer, the term of this patent is extended or adjusted under 35 U.S.C. 154(b) by 87 days.

(21) Appl. No.: 11/628,128

(22) PCT Filed: May 25, 2005

(86) PCT No.: PCT/US2005/018362
§ 371 (c)(1),
(2), (4) Date: Nov. 28, 2006

(87) PCT Pub. No.: WO2005/118336
PCT Pub. Date: Dec. 15, 2005

(65) Prior Publication Data
US 2007/0257537 A1    Nov. 8, 2007

Related U.S. Application Data

(60) Provisional application No. 60/575,555, filed on May 28, 2004.

(51) Int. Cl.
*B60N 2/48* (2006.01)
(52) U.S. Cl. .................... 297/391; 297/DIG. 1
(58) Field of Classification Search ............ 297/391, 297/DIG. 1, DIG. 2, 452.61; 156/292, 293
See application file for complete search history.

(56) References Cited

U.S. PATENT DOCUMENTS

| | | | | |
|---|---|---|---|---|
| 3,612,607 A | * | 10/1971 | Lohr | 297/452.27 |
| 4,619,725 A | * | 10/1986 | Muraishi et al. | 156/182 |
| 4,699,427 A | * | 10/1987 | Kobayashi | 297/452.62 |
| 4,744,601 A | * | 5/1988 | Nakanishi | 297/391 |
| 4,840,430 A | * | 6/1989 | Shimada | 297/452.61 |

(Continued)

FOREIGN PATENT DOCUMENTS

FR       2148853       3/1973

(Continued)

OTHER PUBLICATIONS

Patent Abstract of Japan, vol. 012, No. 183 (M-703), May 28, 1988 & JP62 294518, Dec. 22, 1987.

*Primary Examiner*—Peter R. Brown
(74) *Attorney, Agent, or Firm*—Honigman Miller Schwartz and Cohn LLP

(57) ABSTRACT

A head restraint comprising a first core portion including an exterior surface, an interior and a perimeter edge between the exterior surface and the interior, a first outer layer provided about at least a region of said exterior surface of said first core portion, a second core portion including an exterior surface, an interior and a perimeter edge between the exterior surface and the interior, and a second outer layer provided about at least a region of said exterior surface of said second core portion, wherein at least a region of the perimeter edge of the first core portion is attached to at least a region of the perimeter edge of the second core portion to define a perimeter seam therebetween.

21 Claims, 4 Drawing Sheets

U.S. PATENT DOCUMENTS

| | | | |
|---|---|---|---|
| 5,165,754 A | * 11/1992 | Louys | 297/391 |
| 5,257,853 A | * 11/1993 | Elton et al. | 297/391 |
| 5,405,190 A | * 4/1995 | Jeffcoat et al. | 297/391 |
| 5,885,662 A | 3/1999 | Gardner, Jr. | |
| 5,955,204 A | 9/1999 | Yamamoto et al. | |
| 5,984,414 A | * 11/1999 | Adachi et al. | 297/391 |
| 6,149,231 A | * 11/2000 | Wustholz | 297/216.12 |
| 6,183,045 B1 | 2/2001 | Marfilius et al. | |

FOREIGN PATENT DOCUMENTS

| | | | |
|---|---|---|---|
| GB | 1220072 | | 1/1971 |
| JP | 61125306 A | * | 6/1986 |
| JP | 10-016498 | B1 | 1/1998 |
| JP | 2003-025793 | B1 | 1/2003 |
| WO | WO-03/035429 | | 5/2003 |

* cited by examiner

US 7,819,480 B2

TWO-PIECE HEAD RESTRAINT AND METHOD FOR MAKING SAME

RELATED APPLICATIONS

The present application claims the benefit of international patent application serial number PCT/US2005/018362 filed on May 25, 2005, which claims the benefit of U.S. Provisional Patent Application Ser. No. 60/575,555 filed on May 28, 2004 the contents of which are incorporated herein by reference.

BACKGROUND OF THE INVENTION

1. Field of the Invention

The invention is generally related to a head restraint, and in particular to an open style head restraint with a closeout for both aesthetic and/or structural purposes, and a method for making same.

2. Description of the Related Art

Recent legislation has required vehicle seat head restraints to extend higher in vehicles for improved safety. For example, European legislation requires that the top of the head restraint be positioned 750 mm above the hip pivot point, which is substantially higher than most current designs. As a result of these tall seat designs, either the seat back is made taller and/or the head restraint is made taller. Because a taller seat back may obstruct the view of the occupant, it is preferred that the head restraint is made taller and includes a halo or opening to maximize visibility.

With a taller or larger head restraint design made of a foam filler material, the overall weight of the head restraint increases, thereby reducing fuel economy of the vehicle. In addition, a taller or larger head restraint design imposes design constraints, such as a stitch seam for the covering material.

The inventors of the present invention has recognized these and other problems associated with conventional head restraint designs and have developed a two-piece head restraint design that reduces the overall weight of the head restraint, while improving visibility, impact properties, and increasing the modularity of the design.

SUMMARY OF THE INVENTION

A head restraint comprising a first core portion including an exterior surface, an interior and a perimeter edge between the exterior surface and the interior, a first outer layer provided about at least a region of said exterior surface of said first core portion, a second core portion including an exterior surface, an interior and a perimeter edge between the exterior surface and the interior, and a second outer layer provided about at least a region of said exterior surface of said second core portion, wherein at least a region of the perimeter edge of the first core portion is attached to at least a region of the perimeter edge of the second core portion to define a perimeter seam therebetween.

DESCRIPTION OF THE PREFERRED EMBODIMENT

Figure 1:
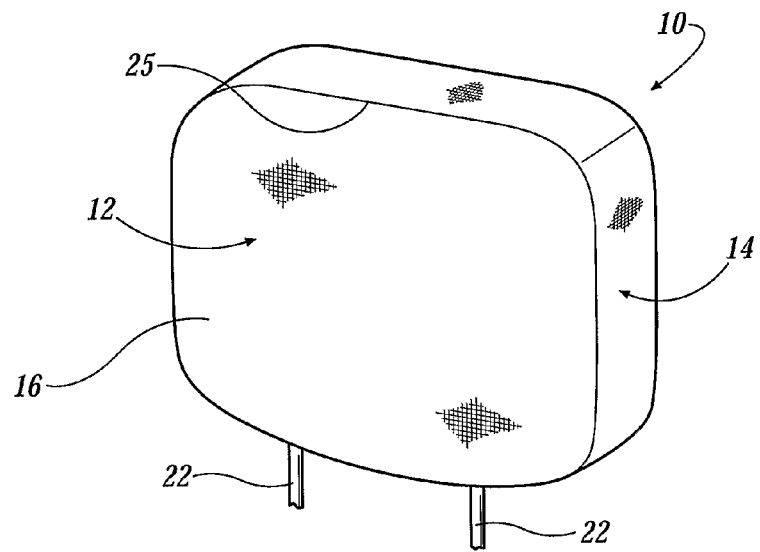
FIG. 1 is a side perspective view of an assembled two-piece head restraint according to an embodiment of the invention.
Figure 2:
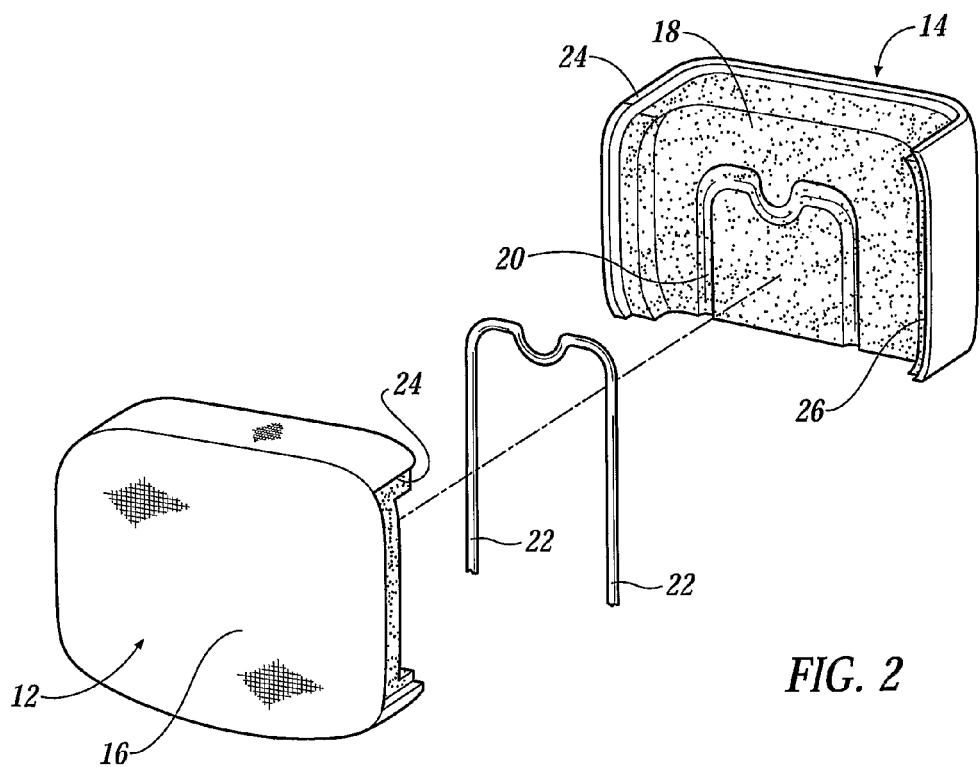
FIG. 2 is an exploded view of the two-piece head restraint of FIG. 1.

Referring now to FIGS. 1 and 2, a head restraint 10 is shown according to an embodiment of the invention. The head restraint 10 comprises a first portion, shown generally at 12, and a second portion, shown generally at 14 that are pre-formed prior to being attached to each other. One or both of the first and second portions 12, 14 may include a cover material 16 for providing an aesthetically pleasing appearance (Class "A" surface) to the head restraint 10. Alternatively, the cover material 16 can be omitted and the outer surfaces of the first and/or second portions 12, 14 may provide an aesthetically pleasing appearance (Class "A" surface) by using spray skin process.

One aspect of the invention is that one or both of the first and second portions 12, 14 is made of core material 18 having energy absorbing properties while providing a dimensionally stable surface. For example, the core material 18 may comprise an expanded polypropylene (EPP) foam material, or the like. The EPP foam material is lighter in weight than conventional materials, such as a foam filler core material. In addition, the density of the EPP foam material is directly proportional to the pressure at which the EPP foam material is injected into the mold tool. For example, a higher injection pressure produces a higher density EPP foam material, as compared to a lower injection pressure. Thus, the density of the EPP foam material can be selected to provide improved energy absorbing properties, as compared to conventional foam filler materials. Further, the EPP foam material can have a non-uniform density throughout the head restraint 10 by selecting the pressure at which the core material 18 is injected into the mold tool. For example, the core material 18 can have a lower density at the outer surface of the head restraint 10, and can have a higher density at the center of the head restraint 10, or vice versa.

As shown in FIG. 2, one or both of the first and second portions 12, 14 can be formed to include a cavity 20 that is adapted for receiving and securing a head restraint post 22 in place. The size of the cavity 20 can be such that the post 22 is press fit into the cavity 20. Alternatively, one or both of the first and second portions 12, 14 may include a relatively softer material, rather than including the cavity 20, for securing the post 22 in place. The relatively softer EPP foam material can be injected into the mold tool using a two-shot injection molding operation in which the first shot of injected EPP foam material is set before injecting the second shot of material.

Once the post 22 is secured in place, the first and second portions 12, 14 can be attached to each other using a variety of different means, and the invention is not limited by the means for attaching the first and second portion 12, 14 to each other. For example, the first and second portions 12, 14 can be attached using a tongue and groove arrangement 24 of a type well-known in the art. The tongue and groove arrangement 24 provides a means for mechanically interlocking and securely attaching the first and second portions 12, 14 to each other. It will be appreciated that other conventional means for attaching the first and second portions 12, 14 to each other are within the scope of the invention.

Once the first and second portions 12, 14 are attached to each other, the head restraint 10 forms a seam 25 between the first and second portions 12, 14. Unlike conventional head restraints in which the seam is sewn by a separate operation, the seam 18 of the invention can be formed by using an edge wrapping technique to provide a clean, neat and precise appearance for the head restraint 10.

Once the cover material 16 is wrapped around the edge 26, the first and second portions 12, 14 can be placed in a bond tool that applies heat to the first and second portions 12, 14. While in a slightly molted state, the first and second portions 12, 14 are pressed together to bond the first and second portions 12, 14 together. The first and second portions 12, 14 can be heated using any suitable means, such as ultrasonic welding, or the like. Alternatively, the first and second portions 12, 14 can be bonded to each other using any suitable means, such as by applying an adhesive to the first portion 12 and/or the second portion 14, the cover material 16, or any combination thereof. It will be appreciated that the invention is not limited by the means for bonding the first and second portions 12, 14 to each other, and that the invention can be practiced by using any suitable means, such as a mechanical fastener, vacuum or bladder bonding, or the like.

After the first and second portions 12, 14 are attached together, any excess cover material 16 can be trimmed by transferring the heat restraint 10 to a trim tool. The trimming of any excess cover material 16 can be accomplished by various means, such as laser cutting, hand trimming, hard tool, water jetting, or the like.

Figure 3A:
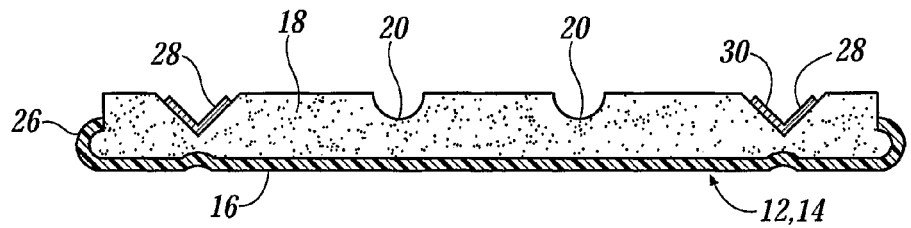
FIG. 3 is a front elevational view of the armature, the cross member, and the closeout of FIG. 2 with the non-permeable material and attaching means for keeping the non-permeable material in place during the manufacturing process.
Figure 3B:
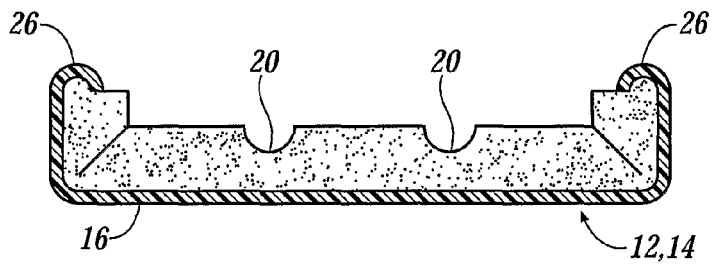

After any excess cover material 16 is trimmed, the head restraint 10 can be transferred to an assembly tool where all designed components, such as the posts 22, are placed into the head restraint 10. As shown in FIGS. 3a and 3b, one or both of the first and second portions 12, 14 may include one or more engineered areas 28 when in an unfolded state. An adhesive 30 is then applied within each engineered area 28 and the first and/or second portion 12, 14 is folded to form the final surface shape for the portion 12, 14.

Figure 4:
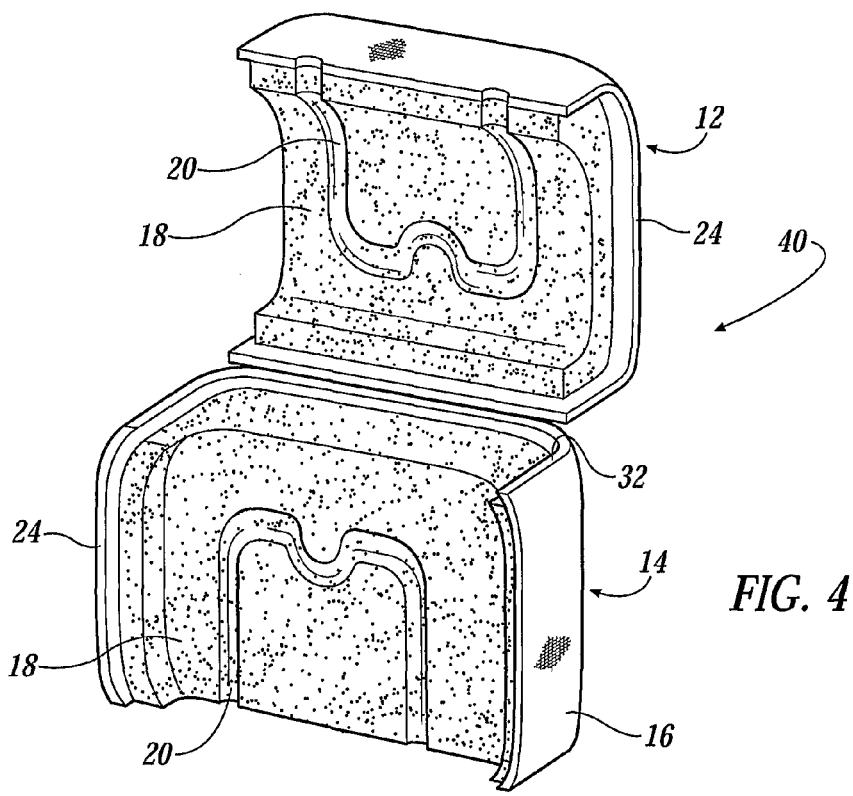
FIG. 4 is a perspective view of applying a mold-release coat to one of the mold surfaces while the mold assembly is in an open position.

Referring now to FIG. 4, a head restraint 40 is shown according to an alternate embodiment of the invention in which the cover material 16 is used as a hinge 32 to form a "clam shell" design.

Figure 5:
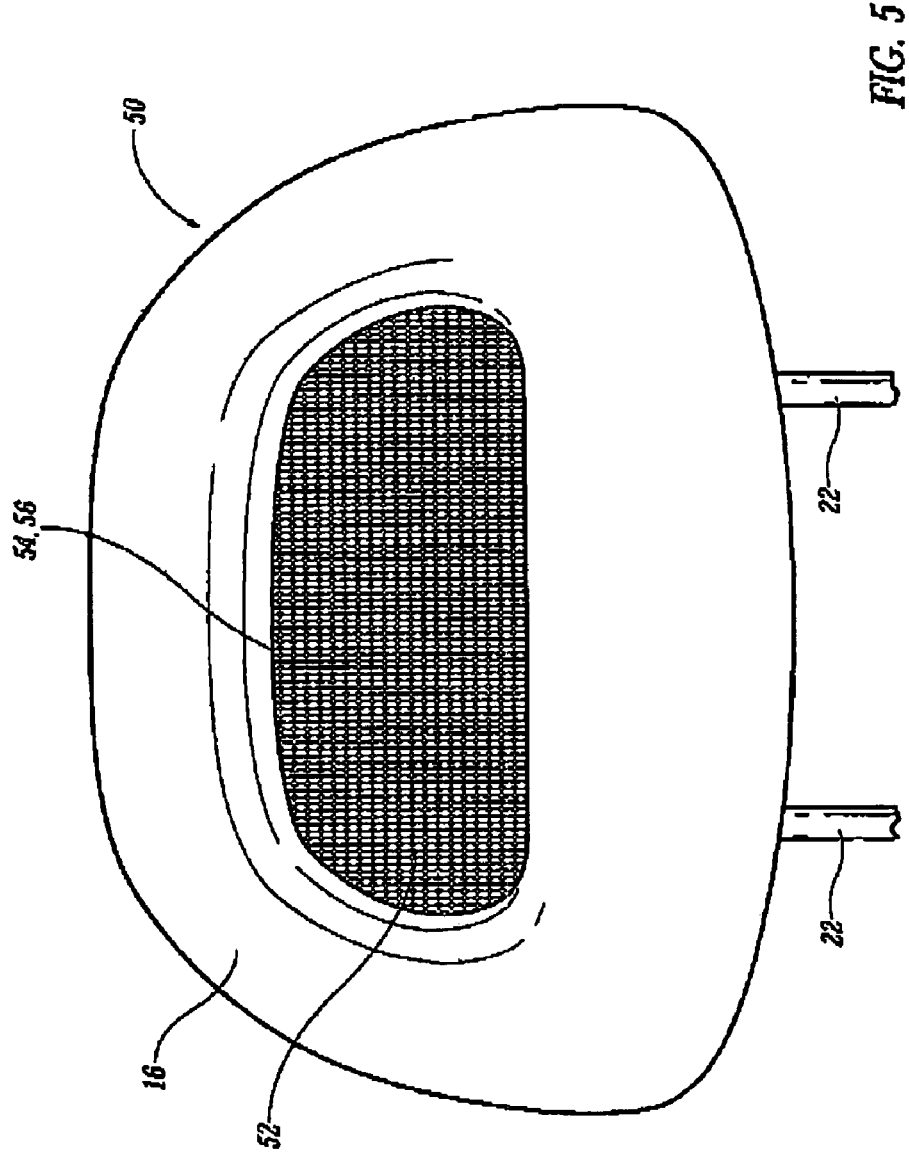
FIG. 5 is a front elevational view of the completed halo style head restraint when removed from the mold assembly.
Figure 6:
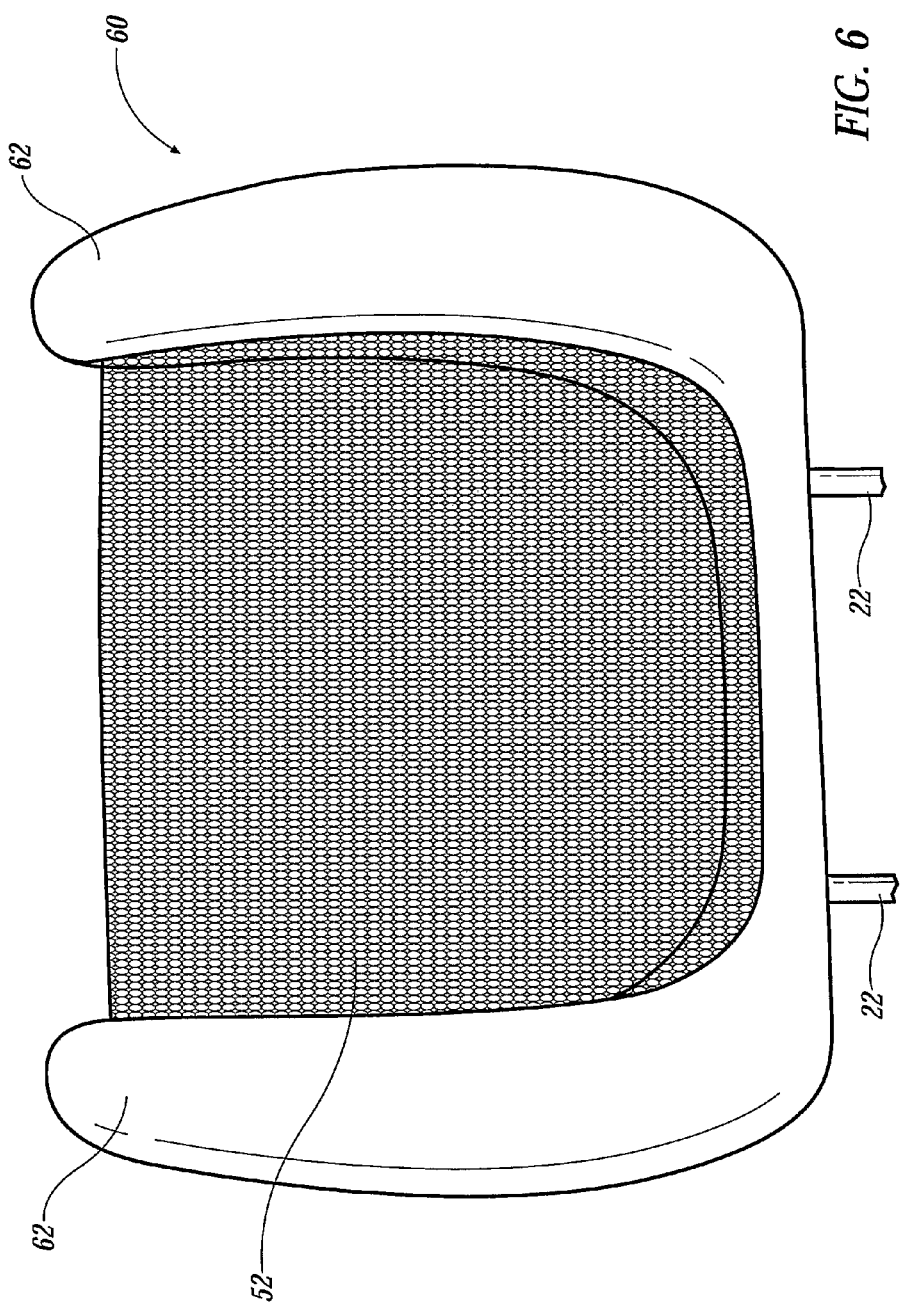
FIG. 6 is a front elevational view of a completed open style head restraint according to an alternate embodiment of the invention.

Other designs for the head restraint 10 are contemplated by the inventors and are within the scope of the invention. For example, the principles of the invention can be applied to a "halo" style head restraint design, as shown in FIGS. 5 and 6. As used herein, the "halo" is defined by the central opening of the doughnut-shaped head restraint 10.

For a "halo" style head restraint design as shown in FIG. 5, a head restraint 50 of the invention may include a closeout 52 made of a mesh or net material that is disposed in an opening defined by first and second core portions. The first and second core portions each include secondary edges 54, 56 that define a secondary seam. However, it will be appreciated that the invention is not limited by the material used for the closeout 52, and that the invention can be practiced by using a closeout 52 made of any desired material. For example, the closeout 52 may be made of a cellular material as shown in the illustrated embodiment, such as a net, mesh, or the like. Alternatively, the closeout 52 may be made of a non-cellular or substantially solid material, such as a plastic, fiberglass, or the like. For safety, the closeout 52 may add structural integrity to the head restraint 50 for absorbing energy during impact. In addition, the closeout 52 may have a "see-through" property to allow the occupant to have a substantially unobstructed view through the halo of the head restraint 50.

Unlike conventional "halo" style head restraint designs, the "halo" style head restraint 50 of the invention does not suffer from leakage associated with the conventional foam materials used to form the head restraint. In the invention, the EPP foam material is cured prior to application of the posts 22 that are used in the invention.

However, the invention is not limited to a "halo" style head restraint design as shown in FIG. 5. For example, as shown in FIG. 6, the invention can be practiced with a head restraint 60 in which an opening is formed between a pair of upright posts 62 without a top and/or bottom member connecting the posts 62 of the head restraint 60 together to form a "horse shoe" and/or a "goal post" head restraint design.

Other alternate embodiments of the invention are contemplated by the inventors and within the scope of the invention. For example, an optional mold-release coat may be applied to each of the mold surfaces (not shown). For brevity, the mold-release coat can be to be applied to only one mold surface. The purpose of the mold-release coat is to promote efficient removal of the head restraint 10, 50, 60 from the mold assembly (not shown) after the forming process is complete.

Then, an optional in-mold coat can be applied to the mold-release coat on each of the mold surfaces when the mold assembly is placed in the open position. The in-mold coat is preferably applied in a generally uniform manner to promote consistent gloss, texture, and color of the outer contour of the head restraint 10, 50, 60. Preferably, the in-mold coat is a waterborne urethane coating, which can be applied by an air-atomized coating applicator such as a spray gun or bell applicator. Alternatively, the composition and means of applying the in-mold coat may be of any suitable type.

Next, a skin coat is applied to the in-mold coat in a manner similar to application of the in-mold coat. The composition of the skin coat is preferably a two component polyurethane elastomer including a polyol component and an isocyanate component as disclosed and described in U.S. Pat. No. 5,885, 662 which is incorporated herein by reference in its entirety. The in-mold coat, which is applied to each mold half bonds to the respective skin coat to form a structural skin. Depending on the formulation of the skin coat, the in-mold coat can be eliminated from the process.

Once the mold-release coat, the in-mold coat and skin coat are applied, the mold assembly is then placed in the closed position. Before the mold halves are moved to the closed position, the coats are preferably allowed to at least partially harden to a non-liquid or gel state. Once the mold halves have reached, or just prior to reaching, the closed position, the mold halves can be mechanically clamped or locked together to ensure that the mold assembly is properly placed and held in the closed position.

When in the closed position, the coats of the first mold half bond with the coats of the second mold half at the junction between the mold halves. That is, the portion of the coats around the perimeter of the first mold surface bond with the portion of the coats around the perimeter of the second mold surface. The bond between the coats of the mold halves is more durable than a conventional head restraint having sewn seams because the bonding of the subject invention is particularly resistant to tearing, ripping, snagging and opening during repeated use over the life of the head restraint 10, 50, 60.

The EPP foam material 18 is then injected into one of the mold cavities. After being injected, the EPP foam material 18 expands in the mold cavity and bonds with the structural skin, formed by the coats to form the head restraint 10, 50, 60. The EPP foam material 18 may be manufactured of a color that is complementary to the color of the structural skin, which provides the advantage of partially concealing any tears, cuts or breakage in the structural skin that may occur during the life of the head restraint.

The EPP foam material 18 is allowed to expand in the mold cavity and partially cure. The EPP foam material 18 is injected into the other mold cavity and allowed to expand and partially cure. While the EPP foam material 18 in both mold cavities are in the partially cured condition, the posts 22 placed within the groove 20 and the mold halves are closed. When the EPP foam material 18 is cured, the mold halves are opened to remove the completed head restraint 10, 50, 60.

While the invention has been specifically described in connection with certain specific embodiments thereof, it is to be understood that this is by way of illustration and not of limitation, and the scope of the appended claims should be construed as broadly as the prior art will permit.

What is claimed is:

1. A head restraint, comprising:
    a first core portion including an exterior surface, an interior and a perimeter edge between the exterior surface and the interior;
    a first outer layer provided about at least a region of said exterior surface of said first core portion;
    a second core portion including an exterior surface, an interior and a perimeter edge between the exterior surface and the interior; and
    a second outer layer provided about at least a region of said exterior surface of said second core portion, wherein material defining at least a region of the perimeter edge of the first core portion is directly attached to material defining at least a region of the perimeter edge of the second core portion, wherein an edge of the first outer layer is directly attached to an edge of the second outer layer to define a perimeter seam therebetween, wherein the first outer layer is a cover wrapped around the perimeter edge of the first core portion and toward the interior of the first core portion, and wherein the second outer layer is a cover wrapped around the perimeter edge of the second core portion and toward the interior of the second core portion such that the perimeter seam is defined between the first outer layer and the second outer layer, and further wherein the perimeter edge of the first core portion is bonded to the perimeter edge of the second core portion, and even further wherein the first and second core portions define a unitary structure formed entirely of expanded polypropylene;
    wherein the first core portion includes a secondary edge disposed radially inward from said perimeter edge of the first core portion to define an opening, and wherein the second core portion includes a secondary edge disposed radially inward from said perimeter edge of the second core portion to define an opening, and further wherein the opening of the first core portion and the opening of the second core portion are aligned to define an opening through the head restraint, and still further wherein at least a region of the secondary edge of the first core portion and the secondary edge of the second portion define a secondary seam.

2. The head restraint according to claim 1, wherein the first outer layer is a cover material wrapped around the secondary edge of the first core portion and toward the interior of the first core portion, and wherein the second outer layer is a cover material wrapped around the secondary edge of the second core portion and toward the interior of the second core portion such that the secondary seam is defined between the secondary edge of the first core portion and the secondary edge of the second core portion.

3. The head restraint according to claim 1, wherein a closeout is disposed within said opening of the head restraint.

4. The head restraint according to claim 3, wherein the closeout is disposed between said secondary edge of said first core portion and said secondary edge of said second core portion.

5. The head restraint according to claim 3, wherein the closeout is a filter material.

6. The head restraint according to claim 5, wherein the filter material includes at least one of a mesh material, and a net material.

7. The head restraint according to claim 1, further comprising:
    a head restraint post extending from one or both of said first core portion and said second core portion.

8. The head restraint according to claim 7, wherein the interior of one or both of said first core portion and said second core portion define a cavity for receiving said post.

9. The head restraint according to claim 1, wherein one of the first and second portions defines a tongue, and the other of the first and second portions defines a groove, and wherein the tongue of the one of the first and second portions is received by the groove of the other one of the first and second portions to define the seam.

10. The head restraint according to claim 1, wherein each attachment of the first core portion to the second core portion is provided without a connection member or intervening material.

11. A method for manufacturing a head restraint, the method comprising:
    defining first and second core portions from polypropylene, each of said portion including an exterior surface, an interior and a perimeter edge between the exterior surface and the interior;
    covering at least a region of said exterior surface of said first core portion with a first outer layer;
    covering at least a region of said exterior surface of said second core portion with a second outer layer;
    directly attaching material defining at least a region of the perimeter edge of the first core portion to material defining at least a region of the perimeter edge of the second core portion;
    directly attaching an edge of the first outer layer to an edge of the second outer layer to define a perimeter seam therebetween
    wrapping the first outer layer around the perimeter edge of the first core portion toward the interior of the first core portion; and
    wrapping the second outer layer around the perimeter edge of the second core portion toward the interior of the second core portion such that the perimeter seam is defined between the first outer layer and the second outer layer prior to the first and second core portions becoming fully cured, depositing a post about the interior of the at least one of the core portions;
    aligning at least a region of the perimeter edge of the first core portion to at least a region of the perimeter edge of the second core portion to define the perimeter seam therebetween; and
    applying pressure between the first core portion and the second core portions to bond at least a region of the perimeter edge of the first core portion with at least a region of the perimeter edge of the second core portion to define the perimeter seam therebetween whereby the first core portion and the second core portion define a unitary structure formed entirely of polypropylene.

12. The method according to claim 11, wherein defining the first and second core portions from polypropylene comprises:
forming a secondary edge disposed radially inward from said perimeter edge of the first core portion to define an opening in said first core portion; and
forming a secondary edge disposed radially inward from said perimeter edge of the second core portion to define an opening in said second core portion.

13. A head restraint, comprising:
a first core portion including an exterior surface, an interior and a perimeter edge between the exterior surface and the interior;
a first outer layer provided about at least a region of said exterior surface of said first core portion;
a second core portion including an exterior surface, an interior and a perimeter edge between the exterior surface and the interior; and
a second outer layer provided about at least a region of said exterior surface of said second core portion, wherein material defining at least a region of the perimeter edge of the first core portion is directly attached to material defining at least a region of the perimeter edge of the second core portion, wherein an edge of the first outer layer is directly attached to an edge of the second outer layer to define a perimeter seam therebetween, wherein the first outer layer is a cover wrapped around the perimeter edge of the first core portion and toward the interior of the first core portion, and wherein the second outer layer is a cover wrapped around the perimeter edge of the second core portion and toward the interior of the second core portion such that the perimeter seam is defined between the first outer layer and the second outer layer, and further wherein the perimeter edge of the first core portion is bonded to the perimeter edge of the second core portion, and even further wherein the first and second core portions define a unitary structure formed entirely of expanded polypropylene; and
a head restraint post extending from one or both of said first core portion and said second core portion.

14. The head restraint according to claim 13, wherein the interior of one or both of said first core portion and said second core portion define a cavity for receiving said post.

15. The head restraint according to claim 13, wherein the first core portion includes a secondary edge disposed radially inward from said perimeter edge of the first core portion to define an opening, and wherein the second core portion includes a secondary edge disposed radially inward from said perimeter edge of the second core portion to define an opening, and further wherein the opening of the first core portion and the opening of the second core portion are aligned to define an opening through the head restraint, and still further wherein at least a region of the secondary edge of the first core portion and the secondary edge of the second portion define a secondary seam; and
wherein the first outer layer is a cover material wrapped around the secondary edge of the first core portion and toward the interior of the first core portion, and wherein the second outer layer is a cover material wrapped around the secondary edge of the second core portion and toward the interior of the second core portion such that the secondary seam is defined between the secondary edge of the first core portion and the secondary edge of the second core portion.

16. The head restraint according to claim 13, wherein the first core portion includes a secondary edge disposed radially inward from said perimeter edge of the first core portion to define an opening, and wherein the second core portion includes a secondary edge disposed radially inward from said perimeter edge of the second core portion to define an opening, and further wherein the opening of the first core portion and the opening of the second core portion are aligned to define an opening through the head restraint, and still further wherein at least a region of the secondary edge of the first core portion and the secondary edge of the second portion define a secondary seam; and
wherein a closeout is disposed within said opening of the head restraint.

17. The head restraint according to claim 16, wherein the closeout is disposed between said secondary edge of said first core portion and said secondary edge of said second core portion.

18. The head restraint according to claim 16, wherein the closeout is a filter material.

19. The head restraint according to claim 18, wherein the filter material includes at least one of a mesh material, and a net material.

20. The head restraint according to claim 13, wherein one of the first and second portions defines a tongue, and the other of the first and second portions defines a groove, and wherein the tongue of the one of the first and second portions is received by the groove of the other one of the first and second portions to define the seam.

21. The head restraint according to claim 13, wherein each attachment of the first core portion to the second core portion is provided without a connection member or intervening material.

* * * * *